United States Patent [19]

Schultz

[11] Patent Number: 5,914,726
[45] Date of Patent: Jun. 22, 1999

[54] APPARATUS AND METHOD FOR MANAGING GRAPHIC ATTRIBUTES IN A MEMORY CACHE OF A PROGRAMMABLE HIERARCHICAL INTERACTIVE GRAPHICS SYSTEM

[75] Inventor: Karl W. Schultz, Fort Collins, Colo.

[73] Assignee: Hewlett-Packard Co., Palo Alto, Calif.

[21] Appl. No.: 08/883,679

[22] Filed: Jun. 27, 1997

[51] Int. Cl.$^6$ ................................................. G06F 15/00
[52] U.S. Cl. ................................ 345/501; 345/433
[58] Field of Search ........................ 345/508, 429–433, 345/501; 707/104

[56] References Cited

U.S. PATENT DOCUMENTS

| | | | |
|---|---|---|---|
| 5,471,579 | 11/1995 | Kimura et al. | 345/505 |
| 5,485,559 | 1/1996 | Sakaibara et al. | 345/433 |
| 5,522,060 | 5/1996 | Kawase et al. | 711/152 |
| 5,745,899 | 4/1998 | Burrows | 707/102 |
| 5,758,361 | 5/1998 | Van Hoff | 707/513 |

*Primary Examiner*—Kee M. Tung
*Assistant Examiner*—Sy D. Luu

[57] ABSTRACT

A method and apparatus for processing graphics information in an attribute-type pipelined graphics system, such as a Programmable Hierarchical Interactive Graphics System (PHIGS). In accordance with the broad aspects of the invention, the method includes the step of reading a program segment defining various graphic primitives to be drawn, wherein the appearance of the primitives are defined, in part, by graphic attributes. After reading the program segment, the method further includes a step of identifying graphic attributes in the program segment, and indexing each attribute into a unique attribute segment of an attribute cache. Finally, the method includes the step of processing each primitive by accessing only those attributes that affect the rendering of the primitive being processed, and transmitting only those attributes that accessed to the graphics pipeline. Advantageously, this reduces the number of total attributes that are sent to the graphics pipeline and processed thereby.

21 Claims, 5 Drawing Sheets

APPARATUS AND METHOD FOR MANAGING GRAPHIC ATTRIBUTES IN A MEMORY CACHE OF A PROGRAMMABLE HIERARCHICAL INTERACTIVE GRAPHICS SYSTEM

BACKGROUND OF INVENTION

1. Field of the Invention

The present invention generally relates to graphics systems, and more particularly to an enhanced cache controller/traverser in a programmable hierarchical interactive graphics system (PHIGS).

2. Discussion of the Related Art

Computer graphics systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are defined by the host CPU in terms of primitive data. For example, when the primitive is a triangle, the host computer may define the primitive in terms of the X, Y and Z coordinates of its vertices, as well as in terms of the red, green, blue and alpha (R, G, B and α) color values of each vertex. Alpha is a transparency value. Additional primitive data may be used in specific applications. Rendering hardware interpolates the primitive data to compute the display screen pixels that represent each primitive, and the R, G, B and α values for each pixel.

The graphics machine generally includes a geometry accelerator, a rasterizer, a frame buffer controller and a frame buffer. The graphics machine may also include texture mapping hardware. The geometry accelerator receives vertex data from the host CPU that defines the primitives that make up the view to be displayed. The geometry accelerator typically comprises a transform component which receives vertex data from the CPU, a clipping component, an illumination component, and a plane equations component. The transform component performs transformations on the vertex data received from the CPU, such as rotation and translation of the image space defined by vertex data. The clipping component clips the vertex data so that only vertex data relating to primitives that make up the portion of the view that will be seen by the user is kept for further processing. The illumination or lighting component calculates the final colors of the vertices of the primitives based on the vertex data and based on lighting conditions. The plane equations component generates floating point equations which define the image space within the vertices. The floating point equations are later converted into fixed point equations and the rasterizer and texture mapping hardware generate the final screen coordinate and color data for each pixel in each primitive.

The operations of the geometry accelerator are computationally very intense. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. The data for a single quadrilateral may be on the order of, for example, 64 words of 32 bits each. Additional data transmitted from the host computer to the geometry accelerator includes illumination parameters, clipping parameters and any other parameters needed to generate the graphics display.

Various techniques have been employed to improve the performance of geometry accelerators. A known way of improving the throughput of a geometry accelerator is to minimize the overall amount of data that must be processed by it. One way that this has been done is to minimize redundancy in the data being sent to the geometry accelerator. This is accomplished by operating on graphics data upstream of the geometry accelerator to reduce the amount of data sent to the geometry accelerator.

Having described the general aspects of all pipelined graphics systems, there are certain attributes that are characteristic of two different types of pipelined graphic systems. A first type operates to process that is presented to the pipeline from an Application Programming Interface (API) in a manner similar to that provided by OpenGL. A second type, however, is configured to receive primitive data and attribute data, or attribute types. The present invention is directed to the improvement of graphics systems of the latter type.

One such system is known as programmable hierarchical interactive graphics system (PHIGS). A problem generally encountered in this type of graphics system is manifest in excessive slowdown of the graphics pipeline due to the processing of the redundant attribute types. For example, consider a graphic pipeline that must process the following code segment;

Set line color (green)
    Set line type (solid)
    Set line width (2.0)
    Set surface color (blue)
    Polyline ( . . . )
    Set line color (green)
    Set line type (dashed)
    Set line width (2.0)
    Set surface color (red)
    Polyline ( . . . )

In the foregoing example, it is recognized that after the first "Polyline" primitive is drawn, the following "Set line color" and "Set line width" commands are redundant to those previously provided in connection with the first "Polyline" primitive. However, as is known in the prior art, all of the attribute types coded in a code segment are generally sent to the graphics pipeline where they are processed. The processing of redundant attribute types (which need not be described herein, as it is understood by those skilled in the art) demands excessive processing by the graphics pipeline, and therefore wastes valuable processing time. While the foregoing example illustrates minor redundancy in attributes delivered to the graphics pipeline, in practice such redundancies are often much worse. Particularly, due to looping, branching, or other execution in a particular software application, many graphic attributes may be set and reset (to a different value) before actually encountering a graphic primitive that is to be drawn on a display.

Therefore, it is desired to provide an improved pre-pipeline processor for implementation in an attribute-type graphics pipeline system.

SUMMARY OF INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for processing graphics information in an attribute-type pipelined graphics system, such as a Programmable Hierarchical Interactive Graphics System (PHIGS). In accordance with the broad aspects of the invention, a method includes the step of reading a program segment defining various graphic primitives to be drawn, wherein the appearance of the primitives are defined, in part, by graphic attributes. After reading the program segment, the method further includes a step of identifying graphic attributes in the program segment, and indexing each attribute into a unique attribute segment of an attribute cache. Finally, the method includes the step of processing each primitive by accessing only those attributes that affect the rendering of the primitive being processed, and transmitting only those accessed attributes to the graphics pipeline. Advantageously, this reduces the number of total attributes that are sent to the graphics pipeline and processed thereby.

In accordance with another important aspect of the invention, the method operates to overwrite redundant attribute information. More particularly, by uniquely indexing attribute types into predefined segments of the attribute cache, subsequent attributes encountered or read in the program segment will be placed on top of the previously indexed attribute in the attribute cache. Returning to the code segment example presented in the background section, the second "Set line color" attribute command simply overwrites the previous "Set line color" attribute command and, therefore, when the second "Polyline" primitive is encountered, only one "Set line color" attribute is sent to, and processed by, the graphics pipeline. Significantly, this feature prevents two identical attributes, or event two different attributes, from being sent to the graphics pipeline between consecutive primitive commands, and thus avoiding unnecessary attribute processing by the pipeline.

Preferably, the present invention is integrated within the graphics API to operate seamlessly therewith. It will be appreciated, however, that it need not, necessarily, be so implemented. Instead, the invention need only be implemented upstream of the graphics pipeline to affect the broad concepts in teachings herein. As will be appreciated, by being implemented in the software, the data structures, and more specifically the attribute cache, established by the present invention will generally reside transiently in the random access memory of a computer system. However, in accordance with an alternative embodiment, the present invention may be implemented in hardware immediately upstream of the graphics pipeline (geometry accelerator). In such an embodiment, the cache and data structures established by the present invention would be fixed in hardware, most commonly an Application Specific Integrated Circuit (ASIC).

In accordance with another aspect of the present invention, an apparatus is provided for processing graphics information in a PHIGS. In accordance with this aspect of the invention, a first computer readable storage medium contains a PHIGS data structure (received from the API and program code), wherein the PHIGS data structure includes a plurality of elements that define one or more graphic primitives. The apparatus further includes a second computer readable storage medium defining a cache comprising a plurality of attribute cache segments. A processing element is further provided for processing the elements in the PHIGS structure, wherein the processing element further includes an attribute indexer and a primitive analyzer. In accordance with the invention, the attribute indexer is configured to identify attributes and uniquely index the attributes into segments of the second computer readable storage medium. The primitive analyzer, therefore, is configured to access and process only those attributes in the second computer storage medium that affect the rendering of a particular graphic primitive.

As is known, the attribute segments may include one or more attributes from the group consisting of line color, line type, line width, surface color, text color, text path, text font, text precision, character spacing, and fill area attributes including empty, hollow, pattern, hatch, solid, etc. Preferably, the data that is actually written into the plurality of attribute cache segments are pointers that point to a particular attribute, which may be stored in a list or look-up table. The advantage of this implementation is that the segments of the cache may be uniformly sized.

In accordance with the preferred implementation, the various attributes are indexed in the attribute cache by way of an op code associated with each attribute. Since each attribute is identified by a unique op code, the indexer may utilize such an op code to uniquely map or index the attributes into the attribute cache. As will be appreciated, an important feature of the present invention resides in the assignment of a unique segment of the attribute cache for a particular attribute type. For example, consider a code segment that includes a first "Set line color" attribute command and a second "Set line color" attribute command (which second command specifies a different color than that specified in the first command) before encountering a graphic primitive to be displayed. In accordance with the invention, the indexer will cause the second encountered attribute type to overwrite the first attribute type in the uniquely assigned attribute segment of the attribute cache. Therefore, when a graphic primitive is ultimately encountered, only the later encountered "line type" attribute will be transmitted with the primitive to the graphic pipeline, and therefore redundant processing by the graphic pipeline will not be incurred. This results in a tremendous time saving over the course of processing the thousands and hundreds of thousands of graphic primitives that are often encountered in the rendering of a single graphics screen.

It will be appreciated from the foregoing that the present invention may be implemented in either hardware, software, or firmware. When implemented in hardware, the invention will generally be embodied in a specially designed integrated circuit that resides functionally upstream of the geometry accelerator of the graphic pipeline. When implemented in software, the invention will be manifest in a specially configured computer hardware platform. That is, the invention, in software, operates to transform a general purpose computing platform into a specifically configured (all be it temporarily) computer architecture.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized the invention above, reference will now be made in detail to the description of the invention as illustrated in the drawings. While the invention will be described in connection with these drawings, there is no intent to limit the invention to the embodiment or embodiments disclosed therein. On the contrary, the intent is to cover all alternatives, modifications and equivalents included within the spirit and scope of the invention as defined by the appended claims.

Figure 1:
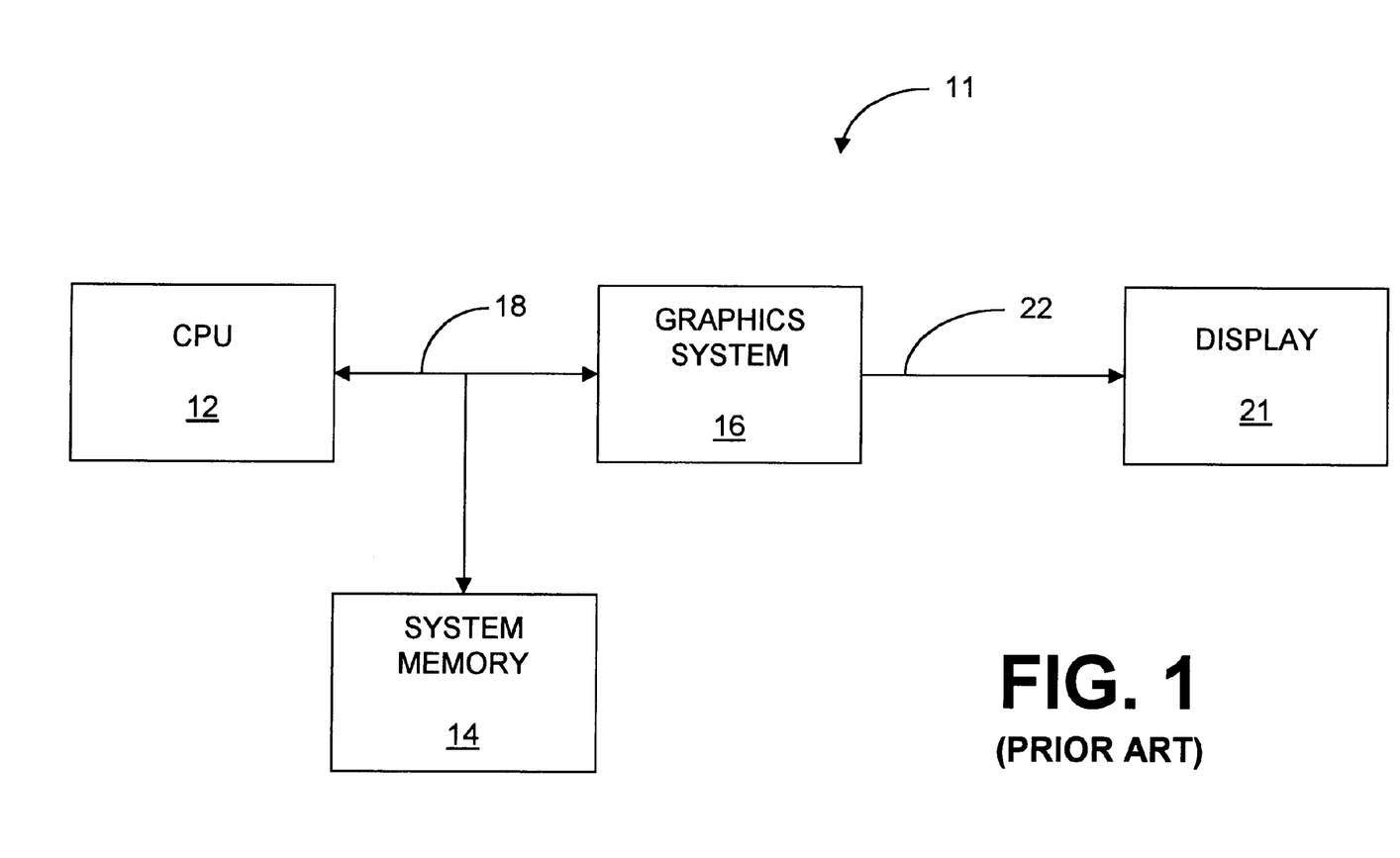
FIG. 1 is a block diagram of a computer graphics system in accordance with the prior art.
Figure 2:
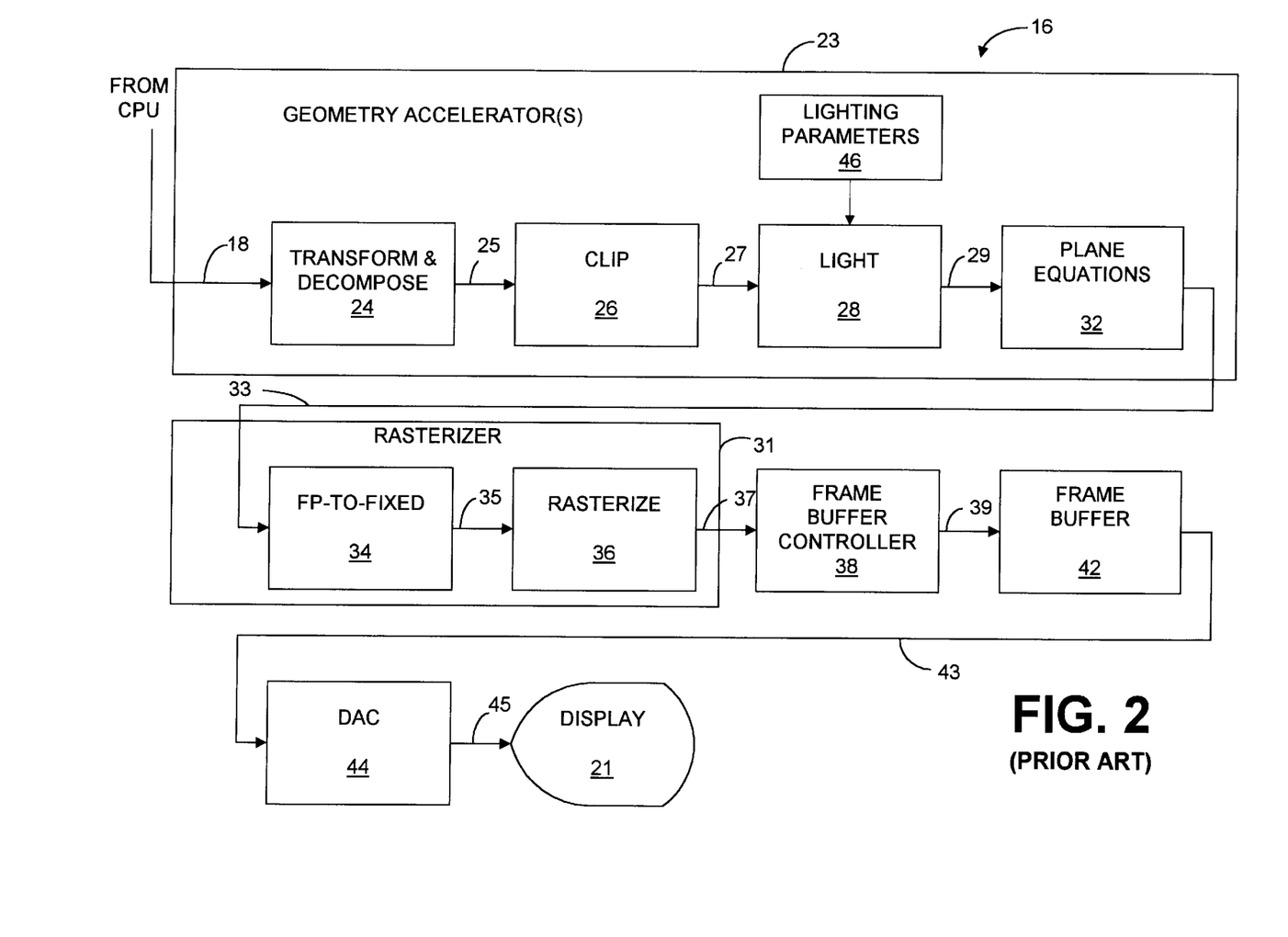
FIG. 2 is a block diagram of a geometry accelerator and rasterizer of a computer graphics system in accordance with the prior art.

Turning now to the drawings, the basic components of a conventional computer graphics display system are shown in FIGS. 1 and 2. The computer graphics display system 16 comprises a geometry accelerator 23, a rasterizer 31, a frame buffer controller 38, and a frame buffer 42. The computer graphics display system 16 may also include texture mapping hardware (not shown). The geometry accelerator 23 receives vertex data from the host CPU 12 that defines the primitives (e.g., triangles) that make up the image to be displayed on the display 21.

The geometry accelerator 23 typically includes a transform component 24, which receives vertex data from the CPU 12, a clipping component 26, an illumination or lighting component 28, and a plane equations component 32. The transform and decomposition component 24 performs transformations on the primitive vertex data received from the CPU 12, such as rotation and translation of the image space defined by vertex data. It also performs primitive decomposition, which decomposes multi-sided polygons into triangle (preferably) primitives, as triangle primitives are generally easier to work with than multi-sided polygons. It will be appreciated that, although the transform and decomposition block has been illustrated herein as a single functional block, the transform and decomposition functions may in fact be handled separately.

The clipping component 26 clips the vertex data so that only vertex data relating to primitives that make up the portion of the view that will be seen by the user is kept for further processing. Generally, all other vertex data is tossed or ignored. This is accomplished by determining whether any of the vertex coordinates of the primitive are located outside of the image space that will be seen by the user. If so, the primitive is clipped so that only the vertex data corresponding to the portion of the primitive inside of the image space is kept for further processing.

The illumination component 28, hereinafter referred to as a lighting machine, calculates the final colors of the vertices of the primitives based on the both vertex data and on the locations of the light source(s) and the user relative to the object being displayed. This information is introduced to the lighting machine 28 through lighting parameters 46. While the lighting parameters 46 is illustrated as a separate block, it will be appreciated that this block is preferably implemented by a section of memory dedicated to storing the various lighting parameters (discussed below). The system CPU 12, through software, ultimately conveys the data for these parameters to the graphics accelerator 23 and its memory.

The plane equations component 32 generates floating point equations which define the image space within the vertices on the display screen. That is, the plane equations component 32 determines how to illuminate pixels between the vertices. The floating point equations are converted into fixed point equations by floating point to fixed point component 34 before being rasterized. The rasterizing component 36 of rasterizer 31 and the texture mapping hardware (not shown) generate the final screen coordinates and color data for each pixel in each primitive. The pixel data is stored in a frame buffer 42 for display on a video display screen 21.

Figure 3:
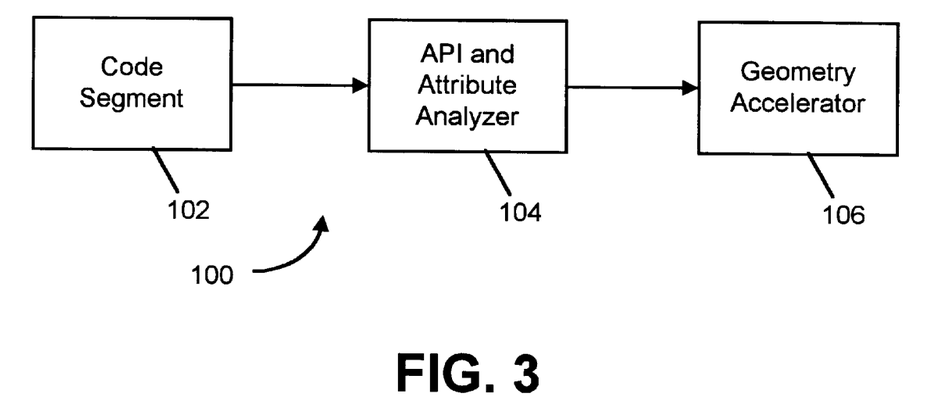
FIG. 3 is a block diagram illustrating the broad functional components of the present invention.

Reference is now made to FIG. 3, which is a diagram of an attribute-type pipelined graphics system 100. Broadly, the system is illustrated as having three primary components: a code segment component 102, an attribute analyzer 104, and geometry accelerator 106. It will be appreciated that the illustrated functional embodiment of FIG. 3 does not demarcate physical boundaries, but is provided merely to emphasize functional delineations. The code segment 102 represents a segment of code provided by, for example, a programmer, or a program application. Typically, such a program (or portion thereof) will be read into a computer memory for operation upon by the CPU. Block 104 represent both an Application Program Interface (API) and an attribute analyzer, constructed in accordance with the teachings of the present invention. API's are well known in the art, and therefore the particular operation of such need not be described herein. The attribute analyzer will be described further below, but the two components are illustrated together in a single block 104, because in the preferred embodiment of the present invention the attribute analyzer of the present invention is intricately designed to operate as a part of the API. Attribute and primitive information is then communicated from the API and attribute analyzer 104 to the geometry accelerator 106 of the graphic pipeline. Further processing downstream of the graphic pipeline has been briefly described in FIGS. 1 and 2 and is well known and understood by the those of skill in the art.

Figure 4:
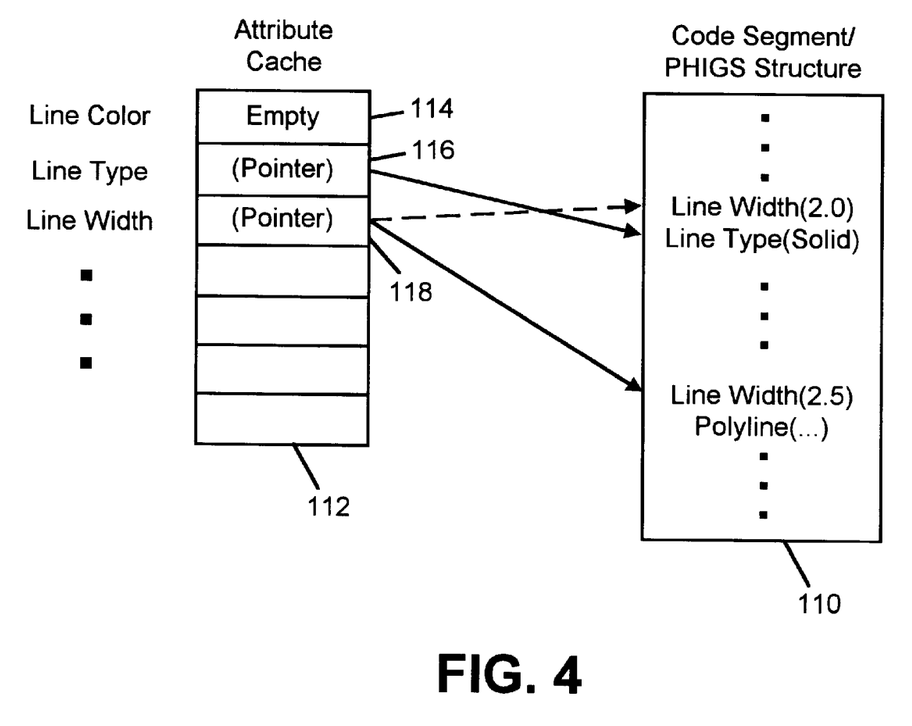
FIG. 4 is a diagram illustrating an attribute cache defined in accordance with the present invention, and the relationship between the cache and a PHIGS structure.

Referring now to FIG. 4, an attribute cache constructed in accordance with the teachings of the present invention is illustrated. More specifically, FIG. 4 illustrates the interrelation between a code segment 110 and an attribute cache 112. The code segment 110 (which corresponds to code segment 102 of FIG. 3) contains a number of lines of graphic commands, including attribute and primitive commands. Such a code segment is typically read into memory where it may be viewed as a data structure. Accordingly, FIG. 4 labels this element as code segment/PHIGS structure. The present invention operates in connection with an API to read and analyze the various commands contained within the PHIGS structure 110 and appropriately and uniquely index them into the attribute cache 112. In this regard, only attribute elements are read into the cache 112, while primitive commands are communicated directly to the geometry accelerator 106. As will be further described below, as each primitive command is communicated to the geometry accelerator 106, all associated attributes will be transmitted, at that time, from the attribute cache 112 to the geometry accelerator 106.

As is known, there are a number of different attribute-types associated in a PHIGS, and more broadly an attribute-type, system. These include attributes relating to both text and graphics. For example, some of the well known text graphics include text alignment, text color index, text path, text font, text precision, character spacing, etc. Graphic attributes include line color, line type, line width, and fill area attributes, such as empty, hollow, pattern, hatch, solid, etc. Moreover, additional or alternative attribute-types may be provided or varied among the different attribute-type systems that are known in the prior art. What is important for purposes of the present invention is that each attribute-type is uniquely assigned to an element (e.g., 114 and 116) of the attribute cache 112. In the illustrated embodiment, element 114 is associated with a line color attribute, element 116 is associated with a line type attribute, and element 118 is associated with a line width attribute.

Upon initialization, all element entries of the attribute cache 112 are cleared, as reflected by a status of empty. Of course, this value will preferably be represented numerically, perhaps by a value of zero. As the API and attribute analyzer evaluate the various commands of the PHIGS structure 110, attributes from the PHIGS structure 110 will be indexed and written into the associated element of the attribute cache 112. For example, the first attribute encountered in the illustrated embodiment is a line width attribute. Upon encountering the line width attribute, the present invention will write a value of that indicative of that attribute into element 118 of the attribute cache 112. In the preferred embodiment, the value indicative of the attribute will be a pointer that points from the element of the attribute cache 112 to the corresponding attribute in the PHIGS structure 110. The second attribute encountered in the PHIGS structure 110 is a line type attribute. An identifying pointer is correspondingly written into element 116 of the attribute cache 112. The next attribute illustrated in the PHIGS structure 110 is a second line width attribute. The attribute analyzer of the present invention evaluates this attribute and writes a corresponding pointer value in element 118 of the attribute cache 112. Since a prior pointer value was already provided at element 118, that pointer value is overwritten. For this reason, the pointer from element 118 to the first line width attribute of the PHIGS structure 110 is illustrated in dash line.

Finally, the last command illustrated in the PHIGS structure 110 is the primitive command "Polyline". This command is a directive for the graphics system to display a graphic primitive on the display 21. Primitives are not written into the attribute cache. Instead, upon encountering a primitive the invention sends both the primitive and all appropriate associated attributes to the geometry accelerator 106. Accordingly, upon encountering the polyline primitive, the present invention sends at least the attributes of line color, line type, and line width to the geometry accelerator 106 to be processed along with the polyline primitive command. The preferred embodiment of the present invention also sends attributes that apply to all primitives, such as transforms. Although not shown, other attribute-types may be included in the attribute cache 112, which attribute-types are not associated with and are not necessary for the display of a polyline primitive command, and therefore need not be communicated to the geometry accelerator 106. For example, a text attribute need not be sent along with a polyline primitive command, while a line type attribute may not need to be sent with a fill area primitive command.

It should be appreciated from the foregoing description that two significant performance enhancements are provided by way of the present invention, over and above operational performances of systems in the prior art, both of which operate to reduce the number of attributes that are communicated to and processed by the geometry accelerator in connection with a given primitive command. Namely, these enhancements include the identification and communication of only those attribute-types that are associated with a particular primitive command. In such prior art such systems of which applicant is aware, all attributes encountered in a particular code segment or PHIGS structure are routely transmitted to the geometry accelerator 106 for processing. Accordingly, transmitting only those attributes that are necessary for displaying a particular or given graphic primitive reduces the overall processing time required by the geometry accelerator.

The second performance enhancement achieved by the present invention is realized by the attribute cache 112. Specifically, the attribute cache 112 allocates one element or location for each different attribute-type. If multiple attributes of a similar type are encountered before encountering a primitive command, the later-encountered attributes are overwritten over the previously encountered attributes. In this way, upon encountering a primitive command, only the most recently encountered attribute-types are transmitted to the geometry accelerator 106. It will be appreciated that these are the only attributes that need to be transmitted to the geometry accelerator, as they are the ones that affect the display of the graphic primitive.

Figure 5:
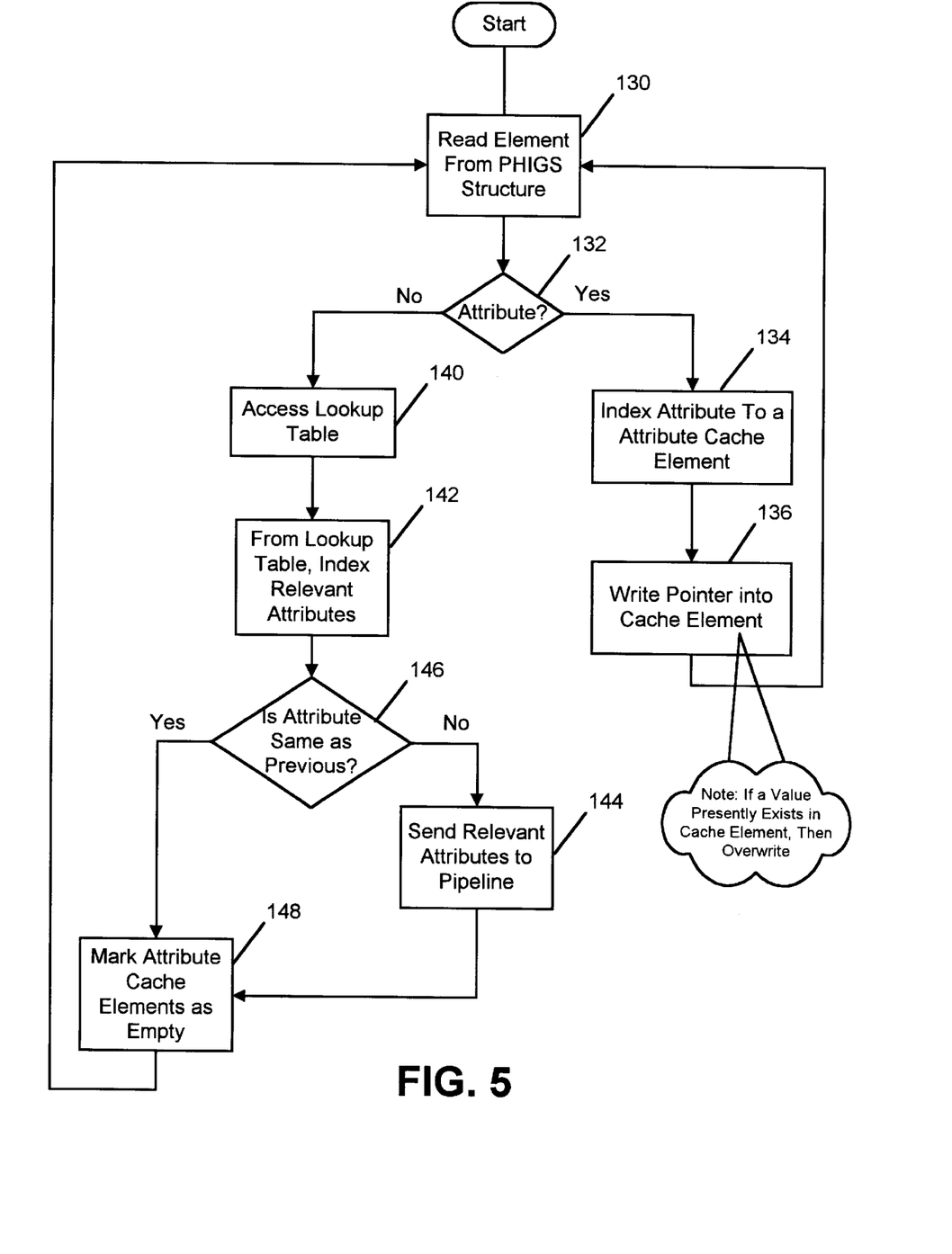
FIG. 5 is a software flowchart illustrating the top-level operation of the present invention.

To better appreciate the functional operation of the present invention, reference is made to the software flowchart presented in FIG. 5. Before delving into the description of the flowchart, it is first noted that the flowchart presented is not necessarily the specific implementation of the preferred embodiment, but rather is a top-level functional description, which is offered to better illustrate the functional aspects of the present invention. In this regard, after initialization, the system of the present invention reads element by element from a PHIGS structure that has been read from a code segment into, for example, memory (step 130). After reading each element, the system (at step 132) determines whether the particular element read is an attribute or a primitive command. If the element is an attribute then the invention indexes the particular attribute to a uniquely assigned attribute element in the attribute cache (step 134). In the preferred embodiment, the system utilizes an op code to perform this indexing step. Op codes are uniquely assigned to attributes and therefore provide an appropriate and usable mechanism for uniquely indexing them. Thereafter, at step 136 the invention writes an identifying value into the appropriate element of the attribute cache. In the preferred embodiment, this identifying value is a pointer, which points to the associated attribute element of the PHIGS structure. As has been previously described, if the element of the attribute cache presently holds a pointer value, that pointer value is merely overwritten by the new pointer value of step 136. Thereafter, the invention returns to step 130 where it reads and processes the next element of the PHIGS structure.

If, however, the evaluation at step 132 identifies the particular element in the PHIGS structure as being a graphic primitive (e.g., the evaluation resolves to NO) then the invention recognizes that the system is to render a graphic primitive on the display. To do this, the primitive command encountered in the PHIGS structure, as well as all associated attributes, must be transmitted to the geometry accelerator. In order to identify all of the associated attributes, the invention accesses a look-up table (step 140). Preferably, the invention evaluates the op code of the particular primitive, which uniquely identifies a given primitive, to access the look-up table. The look-up table then provides a list of all relevant attributes that are associated with a given graphic primitive (step 142). The invention can then return to the attribute cache and access and transmit all attributes identified in the look-up table to the geometry accelerator (step 144). As illustrated by the decisional element 146, if a given attribute has the same value as was sent with that attribute the last time it was transmitted to the geometry accelerator, the invention may avoid duplicatively transmitting that attribute. One manner of implementing this conditional step will be further described in connection with FIG. 6. Thereafter, all elements of the attribute cache, which are transmitted to the geometry accelerator are marked as empty (step 148) and the system returns to step 130.

Figure 6A:
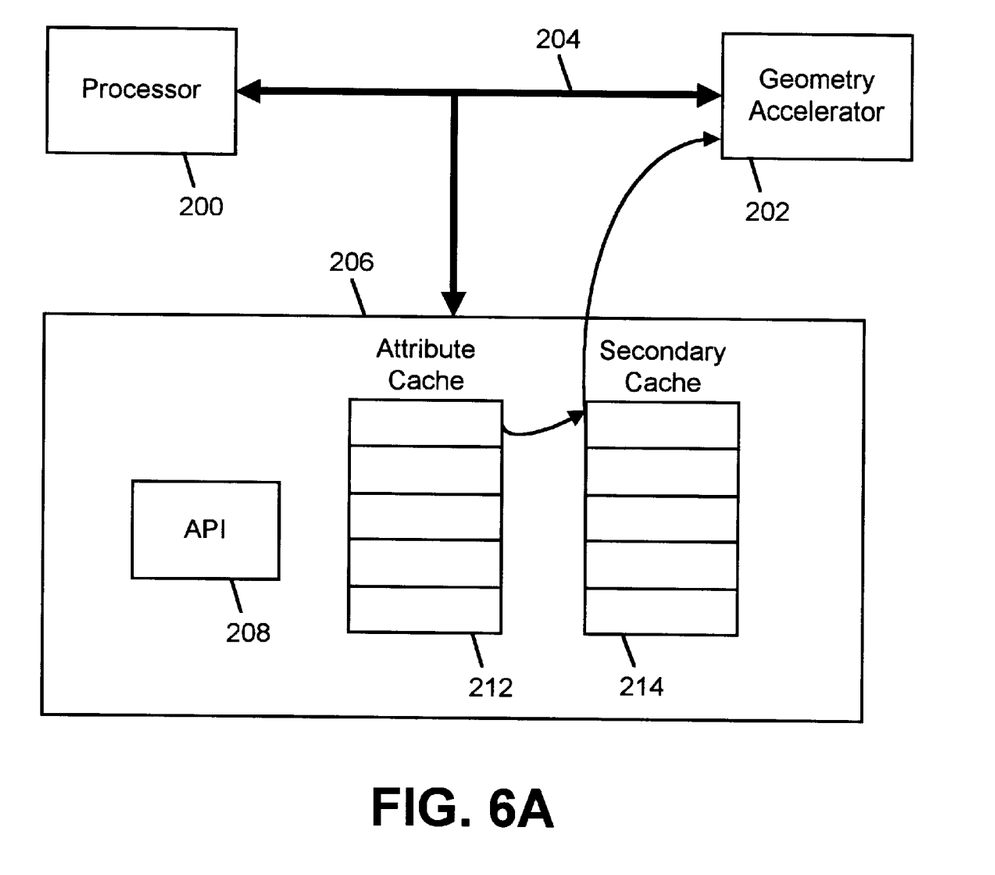
FIGS. 6A and 6B illustrate a dual-caching feature of an alternative embodiment of the present invention.
Figure 6B:
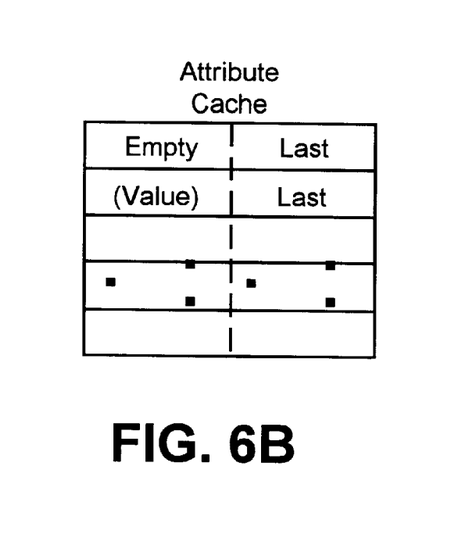

Having described the general features and functionality of the present invention, reference is made to FIGS. 6A and 6B. FIG. 6A merely illustrates the general architectural layout associated with the preferred embodiment of the present invention. Namely, a processor 200 and geometry accelerator 202 may be configured to communicate across a common bus 204 or other communication link. Also in communication with bus 204 is a memory 206, which is preferably a random access memory, as is provided in a general purpose computing environment. An attribute cache 212 and possibly a secondary cache 214 are illustrated as being contained within the memory 206. Also illustrated as residing in the memory 206 is the API, which preferably embodies the present invention, 208. As previously mentioned, the present invention is preferably provided in a software platform that, although it may originate on a diskette or other medium, is ultimately read into a computer memory 206 to occupy a portion thereof, In similar fashion, the attribute cache 212 and possible secondary cache 214 may be created by the API 208 and occupy respective portions of the memory 206. The attribute cache 212, having been previously described, will not be further described herein. Instead, only brief mention will be made to describe the purpose of the secondary cache 214.

As mentioned above, in one embodiment of the present invention, the invention may be configured to evaluate, before transmitting an attribute to the geometry accelerator 202, whether that attribute contains the same value that was transmitted the last time that particular attribute was communicated to the geometry accelerator 202. To achieve this functionality, a secondary cache 214 may be provided to mirror the defined elements of the attribute cache 212. As each element of the attribute cache 212 is transmitted or communicated to the geometry accelerator 202, it is first written into the corresponding element location of cache 214. Therefore, before transmitting any element from the attribute cache 212 to the geometry accelerator 202, this embodiment of the invention may first evaluate the contents of the secondary cache 214 (in the corresponding location) to see if the attribute values are identical. If so, that particular attribute value need not be communicated to the geometry accelerator 202, as it was the last value for that attribute-type communicated thereto.

Referring briefly to FIG. 6B, an alternative construction of the attribute cache is shown. In this embodiment, the attribute cache is merely defined or configured to have two values associated with each attribute-type. A first location will hold the current value associated with the attribute-type, while the second element will maintain the value of the last attribute element transmitted to the geometry accelerator 202.

The foregoing description has been presented for purposes of illustration and description. It is not intended to be exhaustive or to limit the invention to the precise forms disclosed. Obvious modifications or variations are possible in light of the above teachings. For example, the description has focused on central features that are universally applicable in attribute-type (e.g., PHIGS) pipelined graphics systems.

However, variations and idiosyncrasies among differing systems will necessitate some adaptations to the concepts and teachings described above, but such modifications will 10 be well within the capabilities of persons skilled in the art. For example, in some PHIGS embodiments, there may be more that one way to set an attribute. In some embodiments, PHIGS "Line Color" attribute may be set by using an RGB triplet or by using an index into a lookup table. As a result, there are two attribute structure elements that affect the same PHIGS attribute state. Without a determining mechanism, the corresponding entries in the attribute cache cannot both be non-empty. Otherwise, the system would not know which one preceded the other. Accordingly, in such an embodiment, a mechanism may be provided to identify the last-received attribute. This can be done, for example, by clearing the cache entry for the other attributes that can also affect the state.

Another idiosyncrasy of some pipelined graphic systems involves attributes that are order-dependent or cumulative in nature. For example, a series of composite modeling transform attributes, for either pre-concatenation or post-concatenation, cannot be placed onto the attribute cache, since the cache would only remember the last one and the effect of the previous ones would be lost. A solution to this potential problem may be to simply mark these attributes as "never cache" so that the system never places them in the cache and processes them as they are encountered.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An apparatus for processing graphics information in a programmable hierarchical interactive graphics system (PHIGS) comprising:

a first computer readable storage medium containing a PHIGS data structure, the PHIGS data structure including a plurality of ordered elements that define one or more graphics primitives;

a second computer readable storage medium defining an array of attribute cache segments, wherein each segment is uniquely dedicated to a distinct attribute type; and a processing element for processing the elements in the PHIGS structure, the processing element further including:

an attribute indexer configured to sequentially evaluate each of the ordered elements to identify each attribute and uniquely index each attribute into the segment of the second computer readable storage medium that is dedicated for that particular attribute type;

a command identifier configured to identify a directive for a graphics system to display a graphic primitive; and a primitive analyzer, responsive to the command identifier, configured to communicate to a geometry accelerator only those attributes in the second computer readable storage medium that effect the rendering of a particular graphic primitive, identified by the command identifier.

2. The apparatus as defined in claim 1, wherein the plurality of elements in the PHIGS structure includes one or more graphic primitives and one or more graphic primitive attributes.

3. The apparatus as defined in claim 1, wherein the second computer readable storage medium defines a plurality of attribute segments, wherein each attribute segment has a defined relationship to a unique attribute, the attribute segments including at least one from the group consisting of: line color, line type, line width, surface color, text color, text path, text font, text precision, character spacing, and fill area attributes including, empty, hollow, pattern, hatch, and solid.

4. The apparatus as defined in claim 1, further including a cache write segment responsive to the attribute indexer to overwrite data existing in a particular attribute segment, with new attribute segment data.

5. The apparatus as defined in claim 4, wherein the cache write segment is configured to write a pointer value into the particular attribute segment, wherein the pointer points to a particular location in the PHIGS data structure.

6. The apparatus as defined in claim 1, wherein the primitive analyzer is configured to analyze an op code of a particular graphic primitive to ascertain the relevant attribute segments to process for the particular graphic primitive.

7. The apparatus as defined in claim 1, wherein the primitive analyzer is configured to analyze an op code of a particular graphic attribute to identify the particular attribute segment that the graphic attribute is indexed to.

8. An apparatus for processing graphics information in a programmable hierarchical interactive graphics system (PHIGS) comprising:

a first computer readable storage medium containing a PHIGS data structure, the PHIGS data structure including a plurality of elements that define one or more graphics primitives;

a second computer readable storage medium defining an array of attribute cache segments, wherein each segment is uniquely dedicated to a distinct attribute type; and processing means for processing the elements in the PHIGS structure, the processing means further including:

indexing means for identifying attributes in the first computer readable storage medium, and uniquely indexing the attributes into segments of the second computer readable storage medium that are dedicated for the particular identified attributes;

identifying means for identifying a directive for a graphics system to display a graphic primitive; and analyzer means, responsive to the identifying means, for communicating to a geometry accelerator only those attributes in the second computer readable storage medium that effect the rendering of the particular graphic primitive identified by the identifying means.

9. The apparatus as defined in claim 8, wherein the plurality of elements in the PHIGS structure includes one or more graphic primitives and one or more graphic primitive attributes.

10. The apparatus as defined in claim 8, wherein the second computer readable storage medium defines a plurality of attribute segments, wherein each attribute segment has a defined relationship to a unique attribute, the attribute segments including at least one from the group consisting of: line color, line type, line width, surface color, text color, text path, text font, text precision, character spacing, and fill area attributes including, empty, hollow, pattern, hatch, and solid.

11. The apparatus as defined in claim 8, further including a cache write means responsive to the indexing means for overwriting data existing in a particular attribute segment, with new attribute segment data.

12. The apparatus as defined in claim 11, wherein the cache write means includes means for writing a pointer value into the particular attribute segment, wherein the pointer points to a particular location in the PHIGS data structure.

13. The apparatus as defined in claim 8, wherein the analyzer means further includes means for analyzing an op code of a particular graphic primitive to ascertain the relevant attribute segments to process for the particular graphic primitive.

14. The apparatus as defined in claim 8, wherein the analyzer means further includes means for analyzing an op code of a particular graphic attribute to identify the particular attribute segment that the graphic attribute is indexed to.

15. A method for processing graphics information in a programmable hierarchical interactive graphics system (PHIGS) comprising the steps of:

reading a program segment defining a PHIGS data structure, the PHIGS data structure including both graphic attributes and directives for drawing graphic primitives;

identifying graphic attributes in the PHIGS data structure;

successively evaluating each element in the PHIGS data structure and indexing each attribute type into a unique attribute segment of an attribute cache, until reaching a directive for drawing a graphic primitive; and communicating to a geometry accelerator for processing the graphic primitive only those attributes that effect the rendering of the primitive being processed.

16. The method as defined in claim 15, further including the initial step of clearing all attribute locations and assuming a predetermined attribute state.

17. The method as defined in claim 15, wherein the step of indexing each attribute further includes the step of examining an op code of the graphic attributes.

18. The method as defined in claim 15, wherein the step of processing each primitive further includes the step of accessing a memory area that associates particular attributes with a given graphic primitive.

19. An apparatus for processing graphics information in a programmable hierarchical interactive graphics system (PHIGS) comprising:

a first computer readable storage medium containing a PHIGS data structure, the PHIGS data structure including a plurality of ordered elements that define one or more graphics primitives;

a second computer readable storage medium defining an array of attribute cache segments, wherein each segment is uniquely dedicated to a distinct attribute type;

a third computer readable storage medium defining an array of attribute cache segments, wherein each segment is uniquely dedicated to a distinct attribute type; and a processing element for processing the elements in the PHIGS structure, the processing element further including:

an attribute indexer configured to sequentially evaluate each of the ordered elements to identify each attribute and uniquely index each attribute into the segment of the second computer readable storage medium that is dedicated for that particular attribute type;

a command identifier configured to identify a directive for a graphics system to display a graphic primitive;

means, responsive to the command identifier, for communicating the contents of the second computer readable storage medium to a geometry accelerator for displaying the graphic primitive;

means for copying contents of the second computer readable storage medium into the third computer readable storage medium; and means for clearing the contents of the second computer readable storage medium.

20. The system as defined in claim 19, further including means for transferring attribute values from the second computer readable storage medium into the third computer readable storage medium.

21. The system as defined in claim 19, wherein the third computer readable storage medium is constructed from the same physical memory as the second computer readable storage medium, but is logically constructed as a separate array of elements.

* * * * *